United States Patent
Dembski-Minssen et al.

(10) Patent No.: US 8,195,199 B2
(45) Date of Patent: Jun. 5, 2012

(54) METHOD AND APPARATUS FOR DEACTIVATING MOBILE RADIO STATIONS FROM THE NETWORK

(75) Inventors: Ricklef Dembski-Minssen, Sittensen (DE); Jens Kebbel, Adendorf (DE); Florian Wolff, Hamburg (DE); Stefan von der Heide, Norderstedt (DE)

(73) Assignee: Siemens Aktiengesellschaft, München (DE)

( * ) Notice: Subject to any disclaimer, the term of this patent is extended or adjusted under 35 U.S.C. 154(b) by 569 days.

(21) Appl. No.: 12/086,446

(22) PCT Filed: Sep. 7, 2006

(86) PCT No.: PCT/EP2006/066092
§ 371 (c)(1),
(2), (4) Date: Jun. 12, 2008

(87) PCT Pub. No.: WO2007/071462
PCT Pub. Date: Jun. 28, 2007

(65) Prior Publication Data
US 2009/0047941 A1    Feb. 19, 2009

(30) Foreign Application Priority Data

Dec. 15, 2005    (DE) .......................... 10 2005 060 029

(51) Int. Cl.
*H04W 24/00* (2009.01)
*H04M 3/00* (2006.01)
(52) U.S. Cl. ..................................... 455/456.4; 455/420
(58) Field of Classification Search .................. 455/420, 455/456.4, 418, 419
See application file for complete search history.

(56) References Cited

U.S. PATENT DOCUMENTS

| 5,907,804 | A | * | 5/1999 | Schroderus et al. | 455/411 |
|---|---|---|---|---|---|
| 6,014,568 | A | * | 1/2000 | Alperovich et al. | 455/456.3 |
| 6,125,283 | A | * | 9/2000 | Kolev et al. | 455/552.1 |
| 6,799,052 | B2 | * | 9/2004 | Agness et al. | 455/456.4 |
| 6,799,155 | B1 | * | 9/2004 | Lindemann et al. | 703/24 |
| 2005/0096088 | A1 | * | 5/2005 | Bae | 455/558 |
| 2005/0266859 | A1 | * | 12/2005 | Tejani et al. | 455/456.4 |

(Continued)

FOREIGN PATENT DOCUMENTS

DE    19833777 A1    2/2000
(Continued)

OTHER PUBLICATIONS

B. Walke, "Mobilfunknetze Und Ihre Protokolle 1, Grundlagen, GSM, UMTS und anderer zellulare Mobilfunknetze, 3. Auflage, 3.7 Aktualisierund des Aufenthaltsbereiches (Location Update)" 2001, B.B. Tuebner, Stuttgart, pp. 259-260.

*Primary Examiner* — Christopher M Brandt

(57) ABSTRACT

Method for deactivating at least one mobile station in a radio communication system, particularly in a picocell on board an aircraft in a GSM mobile radio network, where the radio communication system has a first network element, which forms a transmission/reception device for each mobile station in the radio cell, a second network element which is set up to control the first network element, and a device which is connected between the first network element and the second network element, wherein the device carries out the following steps: detection of a piece of identification information, directed at the at least one mobile station, which is transmitted from the second network element to the first network element, use of this identification information to deactivate the at least one mobile station when a deactivation signal is supplied to the device.

19 Claims, 5 Drawing Sheets

U.S. PATENT DOCUMENTS

| | | |
|---|---|---|
| 2007/0129057 A1* | 6/2007 | Xu et al. ............... 455/410 |
| 2007/0270127 A1* | 11/2007 | Santoro et al. ......... 455/411 |
| 2008/0051142 A1* | 2/2008 | Calvet et al. ........... 455/558 |
| 2010/0041438 A1* | 2/2010 | Brown ..................... 455/558 |

FOREIGN PATENT DOCUMENTS

| | | |
|---|---|---|
| EP | 0891110 A1 | 1/1999 |
| EP | 1039771 A1 | 9/2000 |
| EP | 1041847 A1 | 10/2000 |
| GB | 2343088 A | 4/2000 |
| WO | WO 94/28684 | 12/1994 |
| WO | WO 9834421 A2 | 8/1998 |
| WO | WO 9913673 A1 | 3/1999 |
| WO | WO 0076087 A1 | 12/2000 |
| WO | WO 2004089021 A2 | 10/2004 |
| WO | WO 2006075126 A1 | 7/2006 |

\* cited by examiner

METHOD AND APPARATUS FOR DEACTIVATING MOBILE RADIO STATIONS FROM THE NETWORK

CROSS REFERENCE TO RELATED APPLICATIONS

This application is the US National Stage of International Application No. PCT/EP2006/066092, filed Sep. 7, 2006 and claims the benefit thereof. The International Application claims the benefits of German application No. 10 2005 060 029.8 DE filed Dec. 15, 2005, both of the applications are incorporated by reference herein in their entirety.

FIELD OF INVENTION

The invention relates to a method and an apparatus for deactivating mobile radio stations from the network which are logged-in in a radio cell of a radio communication network, in particular in a picocell of a GSM mobile radio network which is situated on board an aircraft.

BACKGROUND OF INVENTION

A mobile telephone which is logged-in in a radio cell of a mobile radio network continuously exchanges radio waves with a fixed base station of the mobile radio network.

If other electronic devices are situated in the transmission range of the mobile telephone, then the radio waves can cause interference in these devices.

The use of mobile telephones in hospitals is prohibited for this reason, for example. In aircraft the use of private, radio-based communication facilities is not permitted at all nowadays for safety reasons. It is suspected that the radio waves from the private portable devices could disrupt the avionics system of the aircraft.

On the other hand, the use of mobile communication terminal facilities is constantly increasing. There is a growing demand to be able to utilize private communication facilities, in particular those based on the widely used GSM standard (Global System for Mobile Communication), in a manner which is as simple and unrestricted as possible even during a flight.

With the introduction of the "GSM on-board system", the use of private mobile telephones is intended to be permitted in aircraft in future with certain restrictions. For safety reasons, it is not possible in this situation to rely exclusively on the willingness of passengers to cooperate in turning on their mobile telephones only during the flight phase of the journey and turning them off independently during the safety-critical takeoff and landing phases. In order to satisfy the technical safety requirements, it initially appears possible to turn off the base station of the radio cell in the aircraft during takeoff and landing under the control of a deactivation signal provided by the aircraft electronics. In this situation, it would however be disadvantageous that mobile radio stations on the ground would be visible to switched-on mobile telephones as of a particular flying altitude and would stimulate them to emit radio waves.

A mobile communication system is disclosed in WO 9428684 A1 in which the interference-free use of private mobile telephones on board an aircraft or a ship is made possible by the fact that the mobile telephones are connected by means of electrical cables or an infrared interface to the on-board communication system. It is also disadvantageous here that the safety on board depends on the willingness of the passengers to cooperate. Moreover, the cabling or the infrared interface is intricate and elaborate.

SUMMARY OF INVENTION

An object of the invention is to set down a method and an apparatus, by means of which the radio interference effects which are caused by mobile communication terminal facilities in a radio cell of a radio communication network can be eliminated on the network side in as simple a manner as possible.

This object is achieved by a method having the features described in claim an independent claim and by an apparatus having the features described in a further independent claim. Advantageous embodiments of the invention form the subject matter of respective dependent claims.

According to the invention, in the radio access network between the base station (base transceiver station BTS) and the base station controller (base station controller BSC) a device is connected which registers the number of mobile stations logged-in in the radio cell and their identifying information. Two items of subscriber identification information, the "Temporary Mobile Subscriber Identity" (TMSI) and the "International Mobile Subscriber Identity" (IMSI), are used for identification purposes. Triggered by an external event, which is supplied to the device as a deactivation signal, this device initiates an exchange of security messages with each logged-in mobile station. The outcome of this interaction results in the fact that the logged-in mobile stations regard their own "Subscriber Identity Module" (SIM) as invalid, in other words as not authorized. Consequently, no further mobile station transmits interfering radio waves.

With regard to an application in an aircraft, this then also applies if during an approach for a landing the mobile stations situated on board come within range of transmission facilities of a mobile radio network situated on the ground. The inactive operating state of the mobile station is maintained until such time as the air passenger manually turns his mobile telephone off and back on again.

For the purpose of network-side deactivation, the invention provides a system component which is employed in the radio access network, directly downstream of the first network element, in other words downstream of the base station. This system component, also referred to in the following as BSC slave, on the one hand tracks the communication between the base station BTS and the second network element connecting to it, the base station controller BSC. On the other hand, this device according to the invention seizes the initiative as soon as an external event occurs which requires that logged-in mobile stations be deactivated from the network side. The device can be realized as a computer software product, for example as an algorithm, which runs on a computing device of the first network element.

If a plurality of mobile stations is to be placed in an inactive state, it is advantageous if these are combined in groups in each case and deactivated successively. By this means, the signaling capacity in the radio cell is not exceeded.

If only certain mobile stations in a radio cell are to be selectively deactivated, then this can take place using a positive/negative list which is stored in a memory in the device. As soon as a deactivation signal is present, a check is made prior to deactivation as to whether the detected subscriber identification information items (TMSI, IMSI) for a mobile station are contained in this list. As a result, certain selected mobile stations can remain active in the radio cell while others are blocked. A conceivable application could be the grounds of a school, within which one group of communication subscribers (the teaching staff for example) are allowed to use their mobile telephones, whereas another group (students for example) are at least temporarily (during class time for example) not permitted to use theirs.

The detection of the first subscriber identification information item can take place in such a manner that a location registration message routed via the device is used which is transmitted as a response to a request from a mobile station of the third network element to the requesting mobile station.

With regard to detection of the second subscriber identification information item, a location registration message routed by way of the device can advantageously be used, which is transmitted as a request from a mobile station to the third network element.

It is advantageous if the device is hierarchically subordinate to the second network element. As a result, the functional scope of the device operated as a "slave" can be kept small.

This is advantageous in particular in the situation when the device and the first network element are deployed on board an aircraft, where only limited resources are available and strict requirements are specified with regard to reliability.

With regard to an application in an aircraft, it is furthermore advantageous if the second network element is operated as a "master" and is arranged together with the third network element on the ground. Satellite transmission can advantageously be utilized for the signal transfer between the device and the second network element.

The device can be realized for example entirely or partially by means of a computer software product, for example using a computer program on an appropriately configured server.

BRIEF DESCRIPTION OF THE DRAWINGS

The invention will be described in detail in the following part of the description with reference to the drawings, from which further advantageous embodiments, details and developments of the invention can be taken. In the drawings.

DETAILED DESCRIPTION OF INVENTION

In the following part of the description, the invention will be described by way of example of a GSM on-board radio communication system of an aircraft. The invention is naturally not restricted to this application or to a particular embodiment of a radio communication system. A radio communication system is generally understood to be a system in which information is transferred by means of radio waves. The radio communication system according to the invention can therefore be any mobile radio system, for example according to the previously mentioned GSM standard (Global System for Mobile Communications), an integrated-services network, for example according to the UMTS standard (Universal Mobile Telecommunications system), or a fourth generation system. It should also be pointed out that a radio communication system can also be understood to include non-line-bound local networks, such as WLAN for example (Wireless LAN) in accordance with the IEEE 802.11 standard and also broadband networks with wireless access, for example according to the standard IEEE 802.16, and similar networks.

Figure 1:
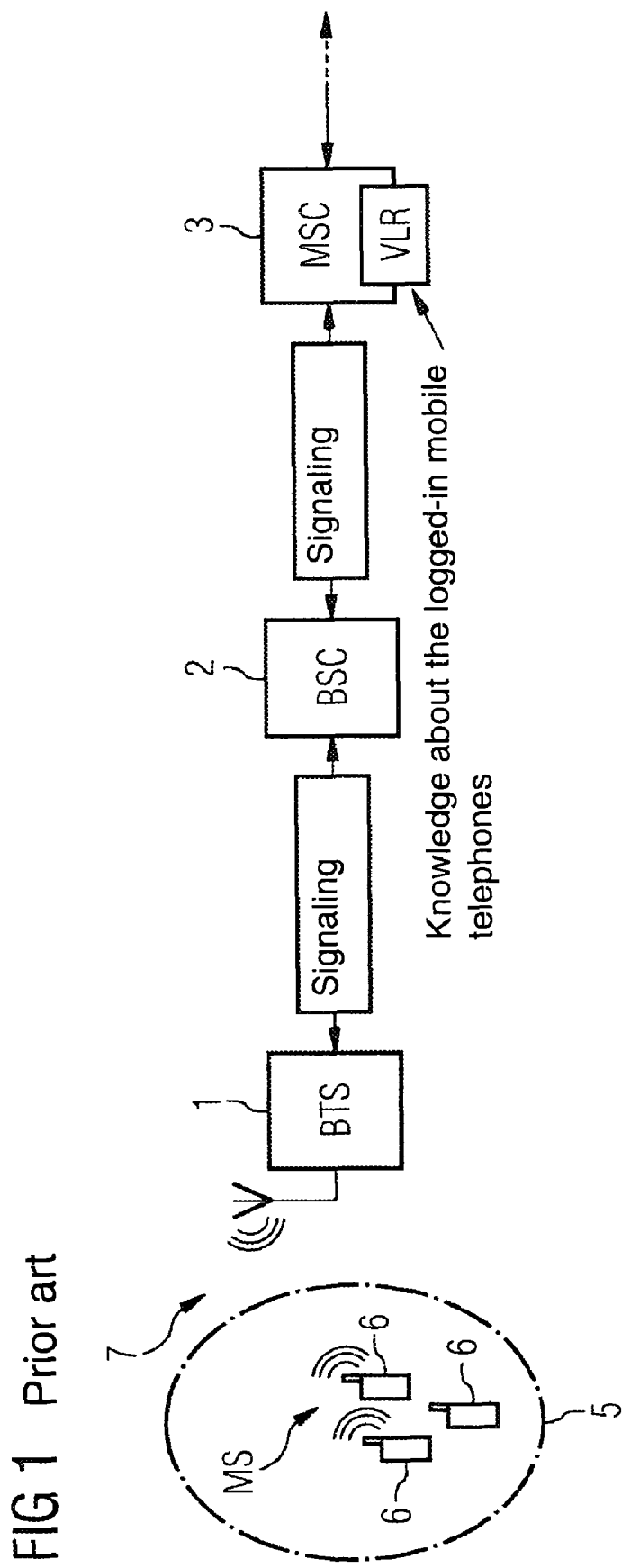
FIG. 1 shows a radio access network of a GSM mobile radio network in accordance with the prior art in a simplified illustration.

The radio access area of a conventional GSM mobile radio network is illustrated schematically in FIG. 1, whereby the functions of the individual modules are assumed to be known and are mentioned here only insofar as this is beneficial to the explanation of the present invention.

As is generally known, a GSM network consists of two types of links. On the one hand there are the radio paths between mobile stations (MS) and their respective base station (BTS) which covers a defined coverage area. On the other hand there are dedicated lines of the fixed line network which connect the base stations to switching facilities (mobile switching center), and also connect the switching facilities to one another. FIG. 1 shows a group of mobile stations 6 (MS) which are supplied via a radio transmission path 7 by a first network element 1 (base station BTS). This base station 1 is connected downstream of a second network element 2, a so-called base station controller BSC. The base station controller BSC 2 controls one or more base stations BTS by way of a signaling connection (Abis link). The BSC is connected on the other side by means of an A-link connection to a third network element (mobile switching center MSC). As already mentioned, in a digital GSM/UMTS mobile radio network the mobile switching center constitutes a full digital switching center. The call management takes place in this. Among other things it has a special file, a visitor register, the so-called Visitor Location Register, VLR. This contains the data relating to those mobile stations that are temporarily situated in the area of the MSC. The knowledge about the logged-in mobile stations is therefore stored in this file.

Figure 2:
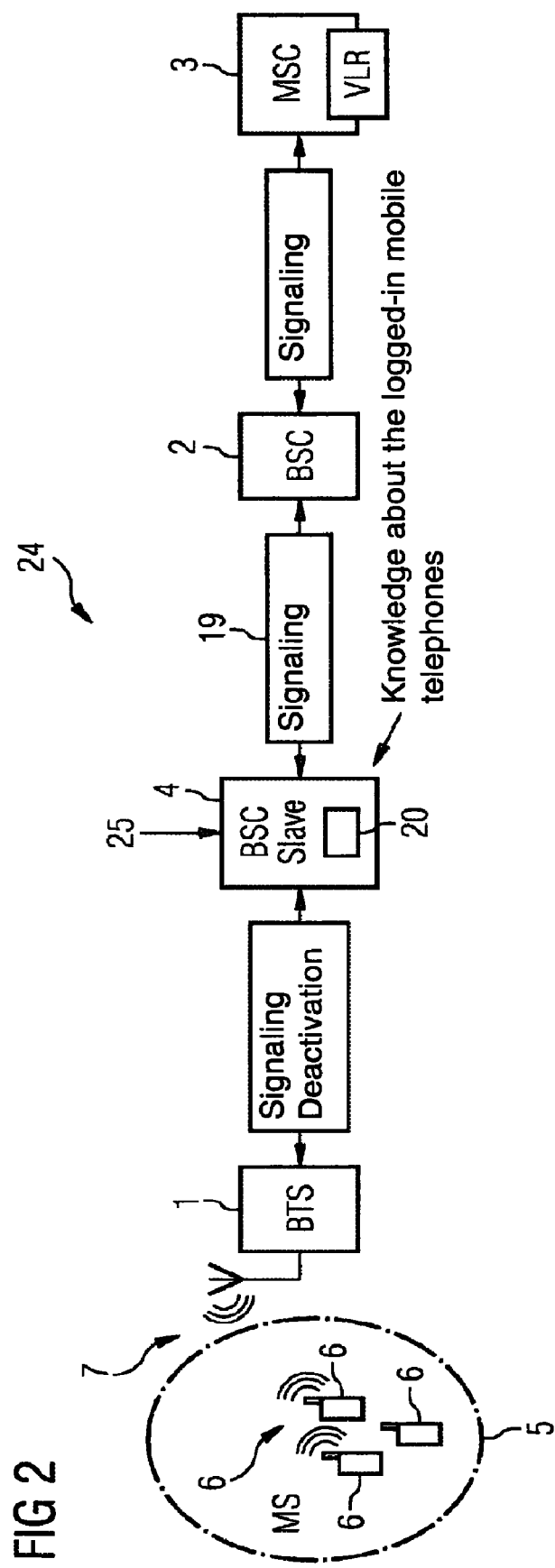
FIG. 2 shows a radio access network of a radio communication system with the device according to the invention for deactivating a mobile station in a schematic illustration.

FIG. 2 shows a radio access network of a radio communication system with the device according to the invention for deactivating a mobile station in a simplified illustration. In this case also, mobile telephones 6 are located in a radio cell 5 and are supplied by a base station 1 (BTS). The device 4 (BSC slave) according to the invention is arranged between the base station 1 and the base station controller 2. The device 4 is connected immediately after the base station 1 (BTS). The signaling between BTS and BSC is conducted according to the invention by way of the BSC slave unit 4.

Figure 5:
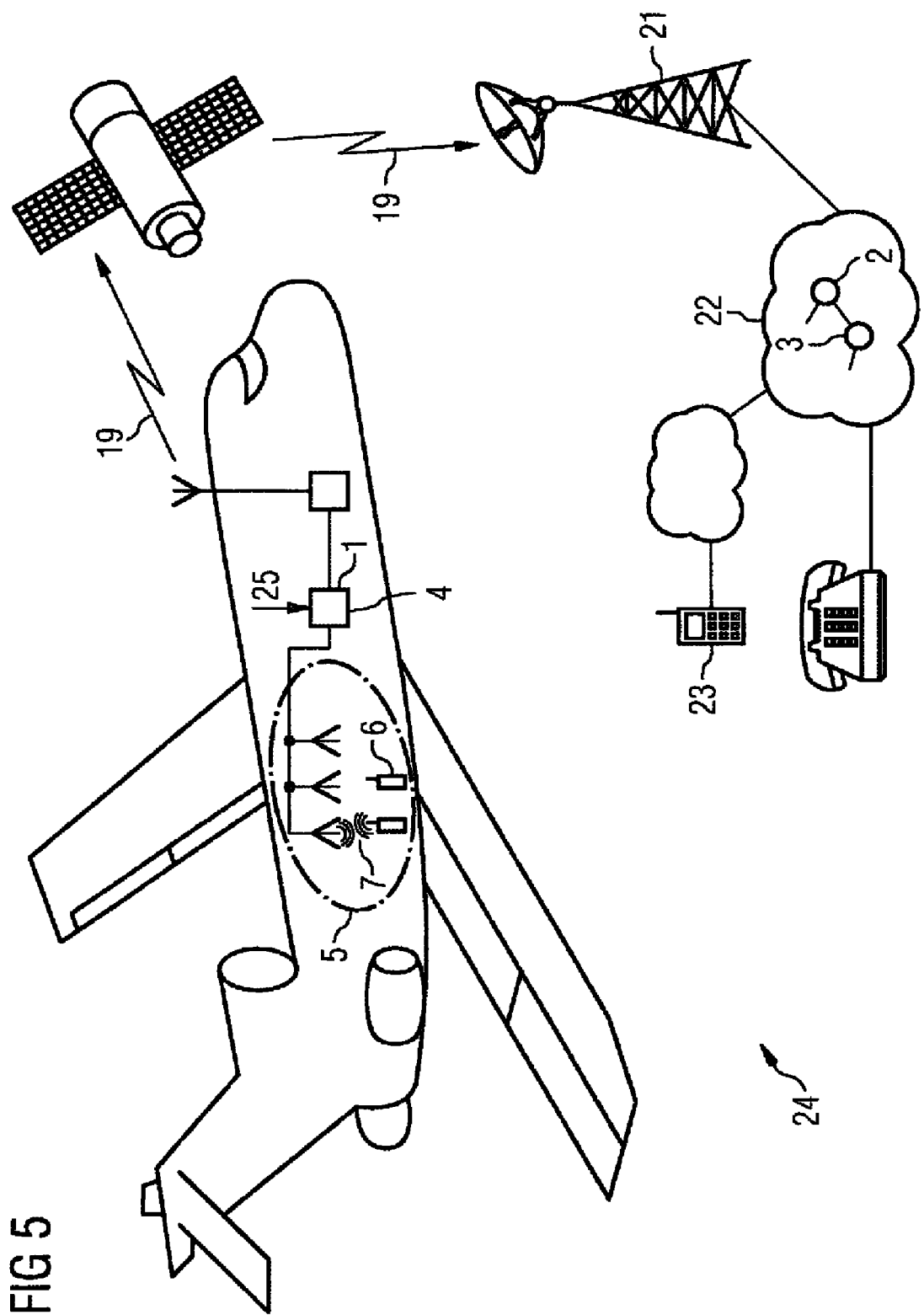
FIG. 5 shows an embodiment of the invention in which mobile stations are situated in a picocell on board an aircraft.

In addition, an embodiment of the invention is described in which the radio cell 5 is a pico radio cell on board an aircraft (FIG. 5). The base station BTS and the base station controller BSC in FIG. 5 exhibit the known GSM functionality. Merely the technical equipment implementation of these devices 1 and 4 is tailored to the site of usage in the aircraft and the information transfer between the BSC slave 4 on board the aircraft and the BSC 2 situated on the ground is effected not by means of lines but by means of a satellite link 19 (FIG. 5).

The BSC slave 4 module according to the invention is used in order to track the communication between BTS 1 and BSC 2 and, exercising control depending on an external event, to intervene in such a manner that no emission of interfering radio waves results and if possible there is thus no detrimental effect on the avionics system of the aircraft.

In the following, the protocol execution occurring during deactivation of logged-in mobile stations 6 is explained in more detail by means of signal diagrams; in FIGS. 3 and 4 the time is denoted by an arrow and the letter "t".

Figure 3:
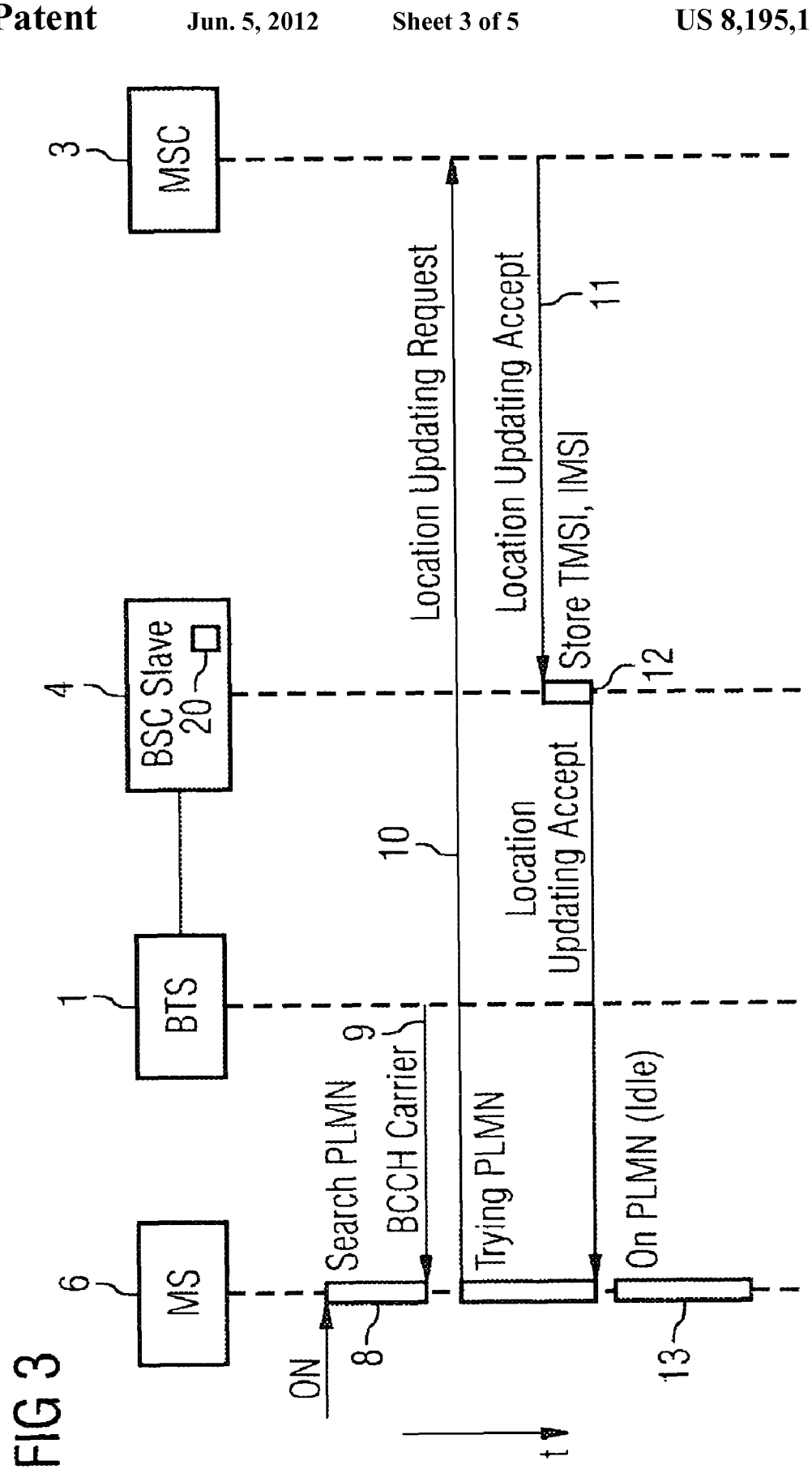
FIG. 3 shows a protocol execution with regard to the inventive recording of the identifying information of a mobile station by the inventive device for deactivation purposes.

As can be seen from FIG. 3, based on an operating state 8 in which one mobile station starts a search operation for a Public Land Mobile Network (PLMN), a signal 9 (Broadcast Channel, BCCH Carrier in FIG. 3) is received by the mobile station 6. This signal 9 is emitted continually by the base station BTS of a mobile radio system. Thereupon the mobile station 6 issues a location request 10 (Location Updating Request in FIG. 3) which is forwarded by way of the base station BTS and also by way of the inventive BSC slave device to a digital switching center 3 (MSC) on the ground. This switching center 3 (MSC) responds with a signal 11 (Location Updating Accept in FIG. 3). The signal 11 contains the identifying information for the mobile station 6 in the pico radio cell 5, the so-called Temporary Mobile Subscriber Identity, abbreviated to TMSI in the following. This TMSI is now filtered out of the signal 11 by the BSC slave and stored in a memory device 20 in the BSC slave. This operation (Store TMSI) is identified in FIG. 3 by the reference character 12. At the end of the signal diagram in FIG. 3 the mobile station 6 is in an operating state 13 (On PLMN Idle) after receipt of the signal 11.

As a result of recording the identifying information (TMSI) in the memory device 20 of the BSC slave unit 4 the knowledge about mobile telephones logged-in to the picocell 5 is available not only in the digital switching center 3 (Mobile Services Switching Center) on the ground but also in the inventive device 4 on board the aircraft. As a result of filtering out the TMSI, the BSE slave 4 is always aware of the number and the identifying information of the mobile stations 6 logged-in to the picocell 5 of the aircraft.

Figure 4:
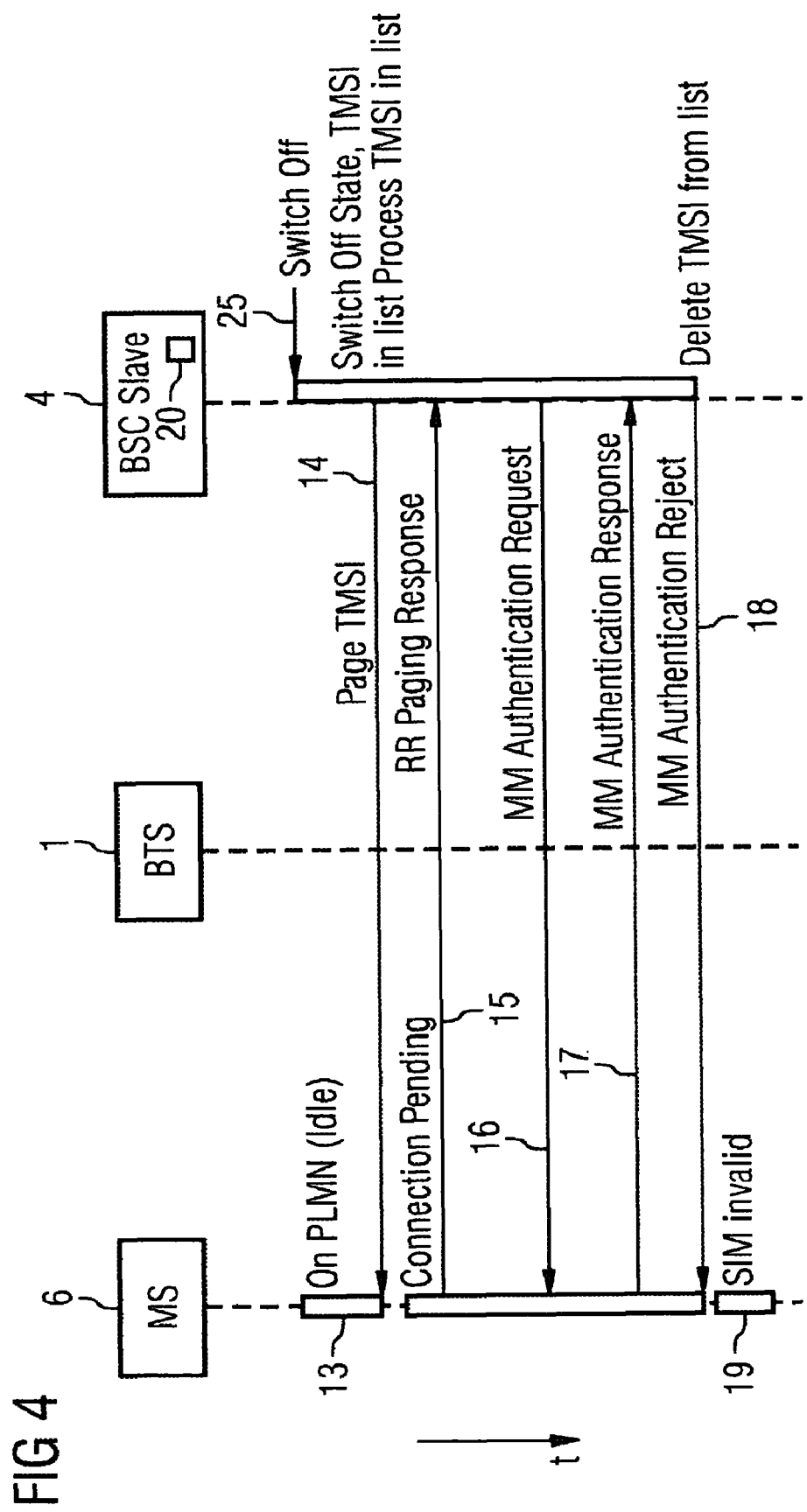
FIG. 4 shows a protocol execution with regard to the network-side deactivation of a mobile station by the inventive device.

If the aircraft for example now commences an approach for a landing, then flight control system generates a deactivation signal 25 which is delivered to the inventive device (BSC slave) 4 (FIG. 4 and FIG. 5). The device 4 (BSC slave) is aware of the number and identifying information of the logged-in mobile stations 6 in the pico radio cell 5 and begins to deactivate these terminals one after the other.

FIG. 4 illustrates the process of deactivation in a time flow. The deactivation operation is initiated by means of the deactivation signal 25 "Switch Off". In response, the BSC slave sends a signal 14 (Page TMSI in FIG. 4) to each of the mobile stations 6 identified by way of the TMSI, one after the other. An addressed mobile station MS responds with the signal 15 (RR Paging Response). The BSC slave then commences an exchange of security messages. To this end it sends the signal 16 (MM Authentication Request) to the mobile station 6. The mobile station 6 in turn responds with the signal 17 (MM Authentication Response). Although the addressed mobile station 6 would as such be authorized, the BSC slave deletes this TMSI from the memory (in FIG. 4, Delete TMSI from list) and sends to the mobile station 6 a rejection signal 18 (MM Authentication Reject) which, according to GSM standard 04.08, causes the mobile station 6 to switch to an operating state 19 in which it regards its own SIM as invalid. During the safety-critical approach to landing or during a climbing flight phase the mobile station 6 therefore emits no further interfering radio waves; this applies even if the aircraft has reached an altitude of less than 3,000 m and the mobile station 6 comes within range of base stations of a mobile radio network on the ground.

The Temporary Mobile Subscriber Identity (TMSI) is a locally and temporally limited identification of the mobile station within the pico radio cell of the aircraft. The air passenger receives the TMSI on entering the pico radio cell 5. When the air passenger leaves the aircraft and turns his mobile station off and back on again, then a handover takes place and the TMSI is newly assigned by the network element 3.

A permanent identification for a subscriber in a mobile radio system is given by the International Mobile Subscriber Identity (IMSI). This IMSI is advised by the mobile radio device to the respective pico radio cell 5. On the basis of the IMSI, certain subscribers can be recognized and the inventive deactivation of the mobile radio device can be performed for these subscribers, possibly taking into consideration an entry in a positive/negative list (black/white list) which is held in a memory area of the device according to the invention.

FIG. 5 outlines the arrangement of the pico radio cell 5 in an aircraft. In this situation, the mobile stations 6 are supported by way of a mobile radio device 7 with antennas of a so-called picocell GSM/GPRS base station, each of which is routed in the aircraft ceiling behind the paneling. As a result, reception is possible at any seating position of the aircraft for private radio communication terminal devices such as mobile telephones, WiFi (wireless fidelity) equipped laptops, organizers or other portable information processing terminal devices. A transmitting power of a few milliwatts is stipulated by the base station for each of these terminal devices. According to the invention, provision is made to ensure that the private terminal devices do not interfere with the avionics system of the aircraft. In the event that an activated mobile telephone using a different standard (CDMA for example) is located among the air passengers, these radio signals are detected by an apparatus not described here in more detail and the air passenger is requested to turn off the terminal.

In this manner a situation is achieved whereby the radio traffic originating from the aircraft is handled exclusively by way of the satellite radio link 19. The satellite radio link 19 can for example utilize the satellite system SATCOM or INMARSAT. In FIG. 5, the terrestrial part in general of the network 24 is denoted by the reference character 22. The base station controller 2 and the digital switching center (MSC) 3 are situated on the ground.

In the embodiment shown in FIG. 5 the base station 1 and the device 4 according to the invention are represented in one block. This is intended to express the fact that the device according to the invention is realized entirely or partially as a so-called computer software product which is implemented with the base station 1 for example on a PC. The device 4 can for example be an algorithm which runs on the PC of the base station.

The invention is naturally not restricted to either a particular communication network or to the present application instance.

It is conceivable that similar requirements apply concerning the activation of mobile radio devices for example in hospitals, in laboratories or in other facilities in which stringent demands are made in respect of the electromagnetic compatibility. Depending on the application, the deactivation signal can be provided by a technical device or manually, by an operator for example.

The invention claimed is:

1. A method for deactivating at least one mobile station in a radio cell of a radio communication system, comprising:
  providing a radio communication system with a first network element which forms a send/receive device for each mobile station of the radio cell, a second network element which is designed for controlling the first network element, and a device which is connected between the first network element and the second network element;
  detecting a first subscriber identification information and a second subscriber identification information which are transferred during an exchange of signaling information between the at least one mobile station and a third network element, wherein the transfer path is routed via the device;

storing the detected subscriber identification information in a memory of the device, the detected subscriber identification information indicating that the at least one mobile station is logged into a network; and deactivating the at least one mobile station logged into the network responsive to a deactivation signal triggered by an external event not caused by use of the at least one mobile station, wherein the deactivation signal is delivered to the device and, causes the at least one mobile station to regard its own subscriber identity module as invalid and prevents the at least one mobile station from transmitting radio waves.

2. The method as claimed in claim 1, wherein the radio cell is a picocell of a GSM (Global System for Mobile Communications) mobile radio network which is situated on board an aircraft.

3. The method as claimed in claim 1, wherein a plurality of mobile stations are combined in groups in each case and are deactivated sequentially one after the other.

4. The method as claimed in claim 1, wherein the deactivation of the mobile station is made dependent on whether the detected subscriber identification information is contained in a list which is present in the device.

5. The method as claimed in claim 1, wherein on detection of the first subscriber identification information a location registration message routed via the device is used, wherein the location registration message is transmitted as a response to a request by a mobile station from the third network element to the requesting mobile station.

6. The method as claimed in claim 1, wherein on detection of the second subscriber identification information a location registration message routed via the device is used, wherein the location registration message is transmitted as a request by a mobile station to the third network element.

7. The method as claimed in claim 1, wherein the device is hierarchically subordinated to the second network element.

8. The method as claimed in claim 1, wherein the device and the first network element are arranged on board an aircraft.

9. The method as claimed in claim 8, wherein the second network element and the third network element are arranged outside of the aircraft, and wherein a link routed via satellites is used for the signal transfer between the device and the second network element.

10. An apparatus for deactivating at least one mobile station in a radio cell of a radio communication system comprising:

a first network element which represents a send/receive device for each mobile station;

a second network element for controlling the first network element;

a device connected into a signaling path between the first network element and the second network element;

a first subscriber identification information detectable by the device;

a second subscriber identification information detectable by the device, wherein the first and second subscriber identification information are transferred between the at least one mobile station and a third network element; and a memory to store the first and second subscriber identification information, the first and second subscriber identification information indicating that the at least one mobile station is logged into a network, wherein the device uses the first and second subscriber identification information to deactivate the at least one mobile station when a deactivation signal is delivered to the device, wherein the deactivation signal is triggered by an external event not caused by use of the at least one mobile station, and causes the at least one mobile station to regard its own subscriber identity module as invalid and prevents the at least one mobile station from transmitting radio waves.

11. The apparatus as claimed in claim 10, wherein the radio cell of the radio communication system is a picocell of a GSM (Global System for Mobile Communications) mobile radio network which is situated on board an aircraft.

12. The apparatus as claimed in claim 10, wherein in the case of a plurality of mobile stations the device combines these into groups and deactivates mobile stations of a group sequentially one after the other.

13. The apparatus as claimed in claim 12, wherein the device makes the deactivation of a mobile station dependent on whether the detected subscriber identification information are contained in a list which is present in the device.

14. The apparatus as claimed in claim 13, wherein the first subscriber identification information is contained in a location registration message routed via the device, which is transmitted as a response to a request by a mobile station from the third network element to the requesting mobile station.

15. The apparatus as claimed in claim 13, wherein the second subscriber identification information is contained in a location registration message routed via the device, which is transmitted as a request by a mobile station to the third network element.

16. The apparatus as claimed in claim 10, wherein the device is hierarchically subordinate to the second network element.

17. The apparatus as claimed in claim 10, wherein the device and the first network element are arranged on board an aircraft.

18. The apparatus as claimed in claim 10, wherein the second network element is arranged outside of the aircraft.

19. The apparatus as claimed in claim 10, wherein the second network element is arranged on the ground and wherein the signal transfer between the device and the second network element is a link routed via satellites.

* * * * *